US009961698B2

(12) United States Patent
Susitaival et al.

(10) Patent No.: US 9,961,698 B2
(45) Date of Patent: May 1, 2018

(54) RADIO BASE STATION, WIRELESS TERMINAL, METHODS PERFORMED THEREIN, COMPUTER PROGRAM, AND COMPUTER-READABLE STORAGE MEDIUM

(71) Applicant: Telefonaktiebolaget L M Ericsson (publ), Stockholm (SE)

(72) Inventors: Riikka Susitaival, Helsinki (FI); Stefan Wager, Espoo (FI); Henning Wiemann, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 317 days.

(21) Appl. No.: 14/401,164

(22) PCT Filed: Oct. 7, 2014

(86) PCT No.: PCT/SE2014/051168
§ 371 (c)(1),
(2) Date: Nov. 14, 2014

(87) PCT Pub. No.: WO2015/065265
PCT Pub. Date: May 7, 2015

(65) Prior Publication Data
US 2015/0334737 A1    Nov. 19, 2015

Related U.S. Application Data

(60) Provisional application No. 61/898,984, filed on Nov. 1, 2013.

(51) Int. Cl.
*H04W 4/00* (2009.01)
*H04W 72/12* (2009.01)
(Continued)

(52) U.S. Cl.
CPC ....... *H04W 72/1284* (2013.01); *H04W 24/02* (2013.01); *H04W 28/0263* (2013.01);
(Continued)

(58) Field of Classification Search
USPC .......................... 370/329, 330, 331, 333, 338
See application file for complete search history.

(56) References Cited

U.S. PATENT DOCUMENTS

2009/0196175 A1* 8/2009 Sammour ............. H04W 36/02
370/230.1
2009/0201868 A1* 8/2009 Chun ................ H04W 72/1278
370/329
(Continued)

FOREIGN PATENT DOCUMENTS

CN   103139918 A   6/2013
EP   2775773 A1   9/2014

OTHER PUBLICATIONS

Unknown, Author, "MAC Aspects of Dual Connectivity", InterDigital Communications, 3GPP TSG-RAN WG2 #83bis, Tdoc R2-133236, Ljubljana, Slovenia, Oct. 7-11, 2013, 1-5.
(Continued)

Primary Examiner — Zewdu A Beyen
(74) Attorney, Agent, or Firm — Murphy, Bilak & Homiller, PLLC

(57) ABSTRACT

Embodiments herein relate to a method performed in a wireless terminal (10) for managing or handling uplink, UL, data transmissions in a radio communications network (1), wherein the wireless terminal (10) is served by a first radio base station (12) and a second radio base station (13) providing dual connectivity to the wireless terminal (10) in the radio communications network (1). The wireless terminal (10) transmits a buffer status report, BSR, to the first and/or second radio base station when a trigger is being fulfilled as configured at the wireless terminal (10). Further-
(Continued)

more, the wireless terminal (10) handles multiplexing of an uplink data transmission towards the first and second radio base stations according to a static configuration defining how to multiplex Media Access Control Service Data Units, MAC SDUs, from one or different logical channels onto transport blocks to be delivered to a physical layer on transport channels of a given radio base station out of the first radio base station and the second radio base station; and/or according to a second configuration where if there is data available for multiple logical channels with equal priority towards one of the radio base stations, then data of a logical channel for which the buffer status report is configured towards a radio base station providing a grant, is prioritized.

19 Claims, 13 Drawing Sheets

(51) Int. Cl.
*H04W 24/02* (2009.01)
*H04W 28/02* (2009.01)
*H04W 88/06* (2009.01)
*H04W 88/08* (2009.01)

(52) U.S. Cl.
CPC ....... *H04W 28/0278* (2013.01); *H04W 88/06* (2013.01); *H04W 28/0273* (2013.01); *H04W 88/08* (2013.01)

(56) References Cited

U.S. PATENT DOCUMENTS

| 2014/0022933 | A1* | 1/2014 | Yi | H04W 24/02 370/253 |
| 2014/0177560 | A1* | 6/2014 | Guo | H04W 72/1268 370/329 |

OTHER PUBLICATIONS

Unknown, Author, "Uplink scheduling and BSRs with dual connectivity", Ericsson, 3GPP TSG-RAN WG2 Meeting #83bis, R2-133412, Ljubljana, Slovenia, Oct. 7-11, 2013, 1-3.

Unknown, Author, "User plane details related to the SeE user plane architecture selection", Renesas Mobile Europe, 3GPP TSG-RAN WG2Meeting #83-bis, R2-133310, Ljubljana, Slovenia, Oct. 7-11, 2013, 1-3.

* cited by examiner

RADIO BASE STATION, WIRELESS TERMINAL, METHODS PERFORMED THEREIN, COMPUTER PROGRAM, AND COMPUTER-READABLE STORAGE MEDIUM

TECHNICAL FIELD

Embodiments herein relate to a radio base station, a wireless terminal, methods performed therein, a computer program, and a computer-readable storage medium. In particular, embodiments relate to managing uplink data transmissions from the wireless terminal in dual connectivity.

BACKGROUND

In a typical cellular radio system or radio communications network, wireless terminals, also known as mobile stations and/or user equipments (UEs), communicate via a radio access network (RAN) to one or more core networks. The wireless terminals can be mobile stations or user equipments (UE) such as mobile telephones, "cellular" telephones, and laptops with wireless capability, e.g., mobile termination, and thus can be, for example, portable, pocket, hand-held, computer-included, or car-mounted mobile devices which communicate voice and/or data via radio access network.

The RAN covers a geographical area which is divided into cell areas, with each cell area being served by a base station, e.g., a radio base station (RBS), which in some networks is also called "NodeB" or "eNodeB". A cell is a geographical area where radio coverage is provided by the radio base station equipment at a base station site. Each cell is identified by an identity within the local radio area, which identity is broadcast in the cell. The base stations communicate over the air interface operating on radio frequencies with the wireless terminals within range of the base stations.

In some versions, particularly earlier versions, of the radio access network, several base stations are typically connected, e.g., by landlines or microwave, to a radio network controller (RNC). The RNC, also sometimes termed a base station controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. Universal Terrestrial Radio Access Network (UTRAN) is essentially a radio access network using WCDMA for wireless terminals. The Third Generation Partnership Project (3GPP) has undertaken to evolve further the UTRAN and GSM based radio access network technologies.

Long Term Evolution (LTE) is a variant of a 3GPP radio access technology wherein the radio base station nodes are connected directly to a core network rather than to RNCs. In general, in LTE the functions of an RNC are performed by the radio base stations. As such, the RAN of an LTE system has an essentially "flat" architecture comprising radio base stations without reporting to the RNC.

The following description, for purposes of explanation, refers to LTE, WCDMA, UTRAN or evolved (E)-UTRAN. This does however not limit the applicability to other technologies.

Dual Connectivity for LTE

With the proliferation of user friendly smart phones and tablets and other wireless terminals, the usage of high data rate services such as video streaming over the radio communications network is becoming commonplace, greatly increasing the amount of traffic in radio communications networks. Thus, there is a great urgency in the radio communications network community to ensure that the capacity of radio communications networks keeps up increasing with this ever-increasing user demand. The latest systems such as LTE, especially when coupled with interference mitigation techniques, have spectral efficiencies very close to the theoretical Shannon limit. The continuous upgrading of current radio communications networks to support the latest technologies and densifying the number of base stations per unit area are two of the most widely used approaches to meet the increasing traffic demands.

Yet another approach that is gaining high attention is to use Heterogeneous Networks where the traditional pre-planned macro base stations, known as the macro layer, are complemented with several low-powered base stations, such as pico base stations or nodes, which may be deployed in a relatively unplanned manner. The 3GPP has incorporated the concept of Heterogeneous Networks as one of the core items of study in the latest enhancements of LTE.

In dual connectivity the idea is that the wireless terminal keeps connectivity to more than one radio base station at a time. Assuming that the macro base stations are able to provide coverage and the pico base stations are there only for capacity enhancements, e.g. for covering coverage holes or areas of non-radio coverage, one alternative architecture is where the wireless terminal maintains the macro connectivity all the time, connected to a radio base station such as a Master eNB (MeNB), and adds a pico connectivity when the wireless terminal is in the coverage area of the pico base station, i.e. connected to a radio base station such as a Secondary eNB (SeNB).

As part of developing embodiments herein it has been discovered that dual connectivity for a wireless terminal from two radio base stations in a radio communications network may in some cases not improve the performance in a satisfactory manner.

SUMMARY

An object of embodiments herein is to provide a mechanism that enhances the performance of the radio communications network in an efficient manner during dual connectivity.

According to an aspect the object is achieved by providing a method performed in or by a wireless terminal for handling or managing uplink data transmissions in a radio communications network. The wireless terminal is served by a first radio base station and a second radio base station providing dual connectivity to the wireless terminal in the radio communications network. The wireless terminal transmits a Buffer Status Report (BSR) to the first and/or second radio base station when a trigger is being fulfilled as configured at the wireless terminal. The wireless terminal then handles multiplexing of an uplink data transmission towards the first and second radio base stations according to a static configuration defining how to multiplex Media Access Control Service Data Units (MAC SDU) from one or different logical channels onto transport blocks to be delivered to a physical layer on transport channels of a given radio base station out of the first and second radio base stations. The wireless terminal may additionally or alternatively handle multiplexing of the uplink data transmission towards the first and second radio base stations according to a second configuration where if there is data available for multiple logical channels with equal priority towards one of the radio base stations, then data of a logical channel for which the buffer status report is configured towards a radio base station providing a grant, is prioritized.

According to another aspect the object is achieved by providing a method performed in or by a radio base station for handling uplink data transmissions from a wireless terminal in a radio communications network. The radio base station is one radio base station out of at least two radio base stations, e.g. a first and a second radio base station, serving the wireless terminal providing dual connectivity to the wireless terminal in the radio communications network. The radio base station receives a BSR from the wireless terminal indicating that a trigger is fulfilled for reporting the BSR. The radio base station further receives an uplink data transmission multiplexed according to a static configuration and/or a second configuration. The static configuration defines how to multiplex MAC SDUs from one or different logical channels onto transport blocks to be delivered to a physical layer on transport channels of a given radio base station out of the at least two radio base stations. The second configuration defines that if there is data available for multiple logical channels with equal priority towards one radio base station out of the at least two radio base stations, then data of a logical channel for which the BSR is configured towards a radio base station providing a grant, is prioritized.

According to yet another aspect the object is achieved by providing a wireless terminal for handling or managing uplink data transmissions in a radio communications network. The wireless terminal is configured for dual connectivity wherein the wireless terminal is served by a first radio base station and a second radio base station in the radio communications network. The wireless terminal is configured to transmit a BSR to the first and/or second radio base station when a trigger is being fulfilled as configured at the wireless terminal. Additionally, the wireless terminal is configured to handle multiplexing of an uplink data transmission towards the first and second radio base stations according to a static configuration and/or a second configuration. The static configuration defines how to multiplex MAC SDUs from one or different logical channels onto transport blocks to be delivered to a physical layer on transport channels of a given radio base station out of the at least two radio base stations. The second configuration defines; where if there is data available for multiple logical channels with equal priority towards one radio base station out of the at least two radio base stations, then data of a logical channel for which the BSR is configured towards a radio base station providing a grant, is prioritized.

According to still another aspect the object is achieved by providing a radio base station for handling uplink data transmissions from a wireless terminal in a radio communications network. The radio base station is one radio base station configured, out of at least two radio base stations, to serve the wireless terminal thereby providing dual connectivity to the wireless terminal in the radio communications network. The radio base station is configured to receive a BSR from the wireless terminal indicating that a trigger is fulfilled for reporting the BSR. The radio base station is further configured to receive an uplink data transmission multiplexed according to a static configuration and/or a second configuration. The static configuration defines how to multiplex MAC SDUs from one or different logical channels onto transport blocks to be delivered to a physical layer on transport channels of a given radio base station out of the at least two radio base stations. The second configuration defines that if there is data available for multiple logical channels with equal priority towards one radio base station out of the at least two radio base stations, then data of a logical channel for which the BSR is configured towards a radio base station providing a grant, is prioritized. The above mentioned radio base station may be a first radio base station e.g. a Master radio base station, or a second radio base station, e.g. a secondary radio base station. The secondary radio base station may be a low power node, i.e. lower power transmissions compared to transmissions of the master radio base station.

Embodiments herein further provide a computer program comprising instructions which, when executed on at least one processor, cause the at least one processor to carry out the methods above, and also a computer-readable storage medium, having stored thereon a computer program, comprising instructions which, when executed on at least one processor, cause the at least one processor to carry out the methods above.

According to embodiments herein it is provided a mechanism to handle or manage an uplink data transmission in a dual connectivity scenario. An advantage with embodiments herein is to provide means for uplink data transmissions in the dual connectivity scenario following a static or a second configuration avoiding uplink data transmission to a "wrong" radio base station, resulting in an improved performance in an efficient manner.

BRIEF DESCRIPTION OF THE DRAWINGS

Embodiments will now be described in more detail in relation to the enclosed drawings, in which.

DETAILED DESCRIPTION

Figure 1:
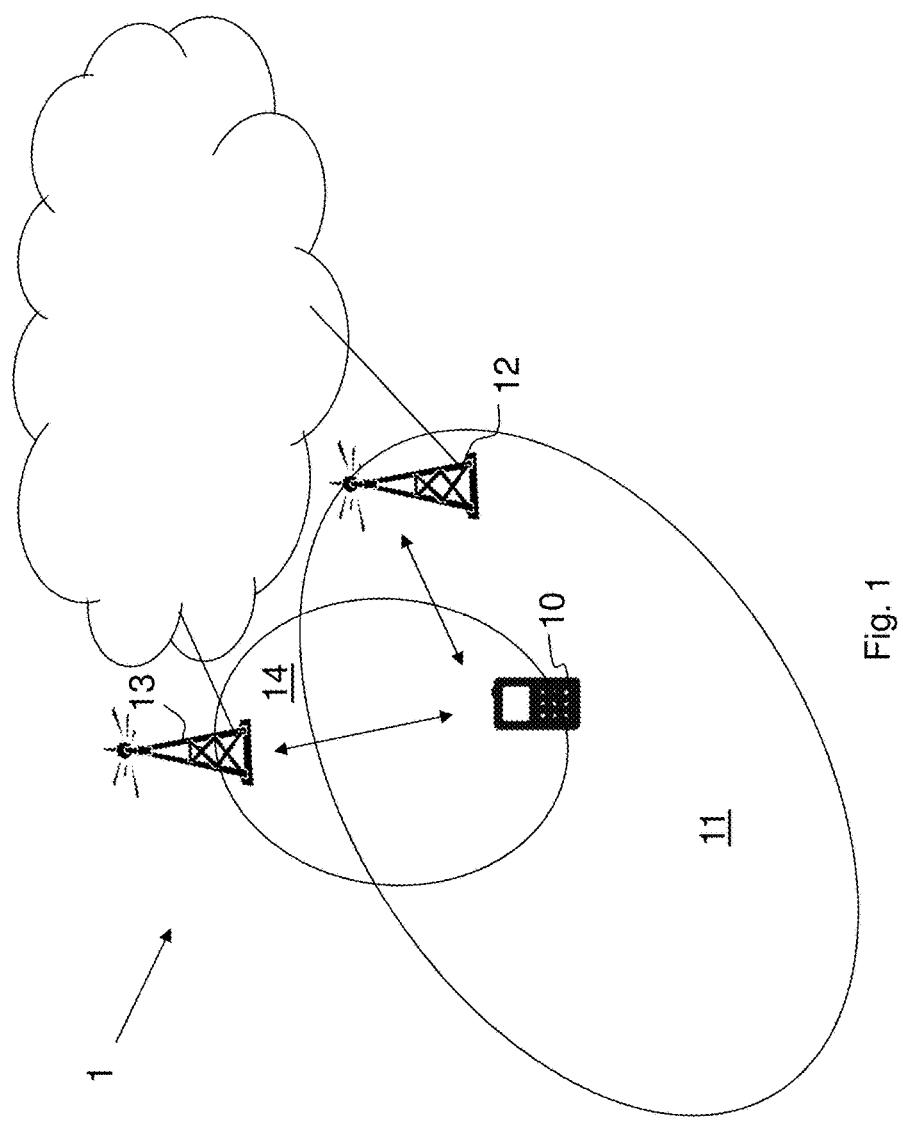
FIG. 1 shows a schematic overview depicting a radio communications network according to embodiments herein.

The embodiments herein relate to radio communications networks in general. FIG. 1 is a schematic overview depicting a radio communications network 1. The radio communications network 1 comprises one or more RANs and one or more CNs. The radio communications network 1 may use a number of different technologies, such as Long Term Evolution (LTE), LTE-Advanced, Wideband Code Division Multiple Access (WCDMA), Global System for Mobile communications/Enhanced Data rate for GSM Evolution (GSM/EDGE), Worldwide Interoperability for Microwave Access (WiMax), or Ultra Mobile Broadband (UMB), just to mention a few possible implementations. The radio communications network 1 is exemplified herein as an LTE network.

In the radio communications network 1, a wireless terminal 10, also known as a mobile station, a user equipment and/or a wireless terminal, communicates via a Radio Access Network (RAN) to one or more core networks (CN). It should be understood by the skilled in the art that "wireless terminal" is a non-limiting term which means any wireless terminal, user equipment, Machine Type Communication (MTC) device, a Device to Device (D2D) terminal, or node e.g. Personal Digital Assistant (PDA), laptop, mobile, sensor, relay, mobile tablets or even a small base station communicating within respective cell.

The radio communications network 1 covers a geographical area which is divided into cell areas, e.g. a cell 11 being served by a first radio base station 12. The first radio base station 12 may serve one or more cells, such as the cell 11. The first radio base station 12 is exemplified herein as a Master radio base station (MeNB) or a macro base station in an LTE system.

A cell is a geographical area where radio coverage is provided by radio base station equipment at a base station site or at remote locations in Remote Radio Units (RRU). The cell definition may also incorporate frequency bands and radio access technology used for transmissions, which means that two different cells may cover the same geographical area but using different frequency bands. Each cell is identified by an identity within the local radio area, which is broadcast in the cell. Another identity identifying the cell 11 uniquely in the whole radio communications network 1 is also broadcasted in the cell 11. The first radio base station 12 communicates over the air or radio interface operating on radio frequencies with the wireless terminal 10 within range of the first radio base station 12. The wireless terminal 10 transmits data over the radio interface to the first radio base station 12 in Uplink (UL) transmissions and the first radio base station 12 transmits data over an air or radio interface to the wireless terminal 10 in Downlink (DL) transmissions.

Furthermore, the radio communications network 1 comprises a second radio base station 13. The second radio base station 13 may be a secondary serving radio base station also referred to as a secondary radio base station (SeNB) or a pico base station in an LTE system, providing radio coverage over a second cell 14. The respective radio base station 12,13 may also be referred to as a NodeB, an evolved Node B (eNB, eNode B), a base transceiver station, an Access Point Base Station, a base station router, or any other network unit capable of communicating with a wireless terminal within the cell served by the respective radio base station depending e.g. on the radio access technology and terminology used. In the dual connectivity the wireless terminal 10 receives/transmit different data from the first and second radio base station on a same or different carrier. The wireless terminal 10 may comprise separate Radio Link Control (RLC) entities and/or Medium Access Control (MAC) entities for different transmission links to respective radio base station. The first radio base station 12 is exemplified as a master radio base station and the second radio base station 13 is exemplified as a secondary radio base station, however, it may be the other way around. The first and second radio base station may also be referred to with a common term 'the radio base station' or network. The wireless terminal 10 is in dual connectivity which means that the wireless terminal is configured to support dual connectivity either on same carrier frequency for first and second links and data, and/or control, transmitted on a first link is different from data, and/or control, transmitted on a second link OR carriers for the first and second links are different and data and/or control sent on the links is the same.

According to embodiments herein the wireless terminal 10 transmits BSRs to one or more radio base stations and embodiments herein provide a mechanism to map data or an UL data transmission e.g. of a split bearer as defined below and a corresponding logical channel to a correct physical grant provided by the network, such as a network node e.g. a radio base station or a radio network controller, which mechanism further improves the performance of the radio communications network 1. The wireless terminal 10 further transmits UL data transmissions according to a static configuration and/or a second configuration in order to improve performance and/or data throughput. The static configuration defines for the wireless terminal 10 how to multiplex Medium Access Control Service Data Units (MAC SDU) from one or different logical channels onto transport blocks to be delivered to a physical layer on transport channels of a given radio base station out of the at least two radio base stations. The second configuration states that if there is data available for multiple logical channels with equal priority towards one of the radio base stations, then data of a logical channel for which the buffer status report is configured towards a radio base station providing a grant, is prioritized. For split bearers in an architecture including one RLC entity per radio base station for a split bearer, Buffer Status Reports (BSR) and Scheduling Requests (SR) due to RLC status reports and RLC retransmissions of the RLC entity in a given radio base station, such as the MeNB or SeNB, may be sent from the wireless terminal 10 towards that given radio base station to which the RLC entity belong to. In the multiplexing and Logical channel prioritization (LCP) entity, the wireless terminal 10 may map data due to RLC status report and RLC retransmission to the grants provided by the corresponding radio base station to which RLC entity belong to. For split bearers, BSRs and SRs due to new data may only be reported from the wireless terminal 10 to the radio base station that is configurable by the network. The multiplexing MAC SDUs to the physical layer grants, according to the static configuration, by the wireless terminal 10, may follow a fixed Radio Resource Control (RRC) configuration which is same as used for BSR reporting. Thus, the static and/or second configuration avoid that an uplink data transmission is performed to a "wrong" radio base station, resulting in an improved performance in an efficient manner.

UL Scheduling in e.g. LTE is Below Described

Figure 2:
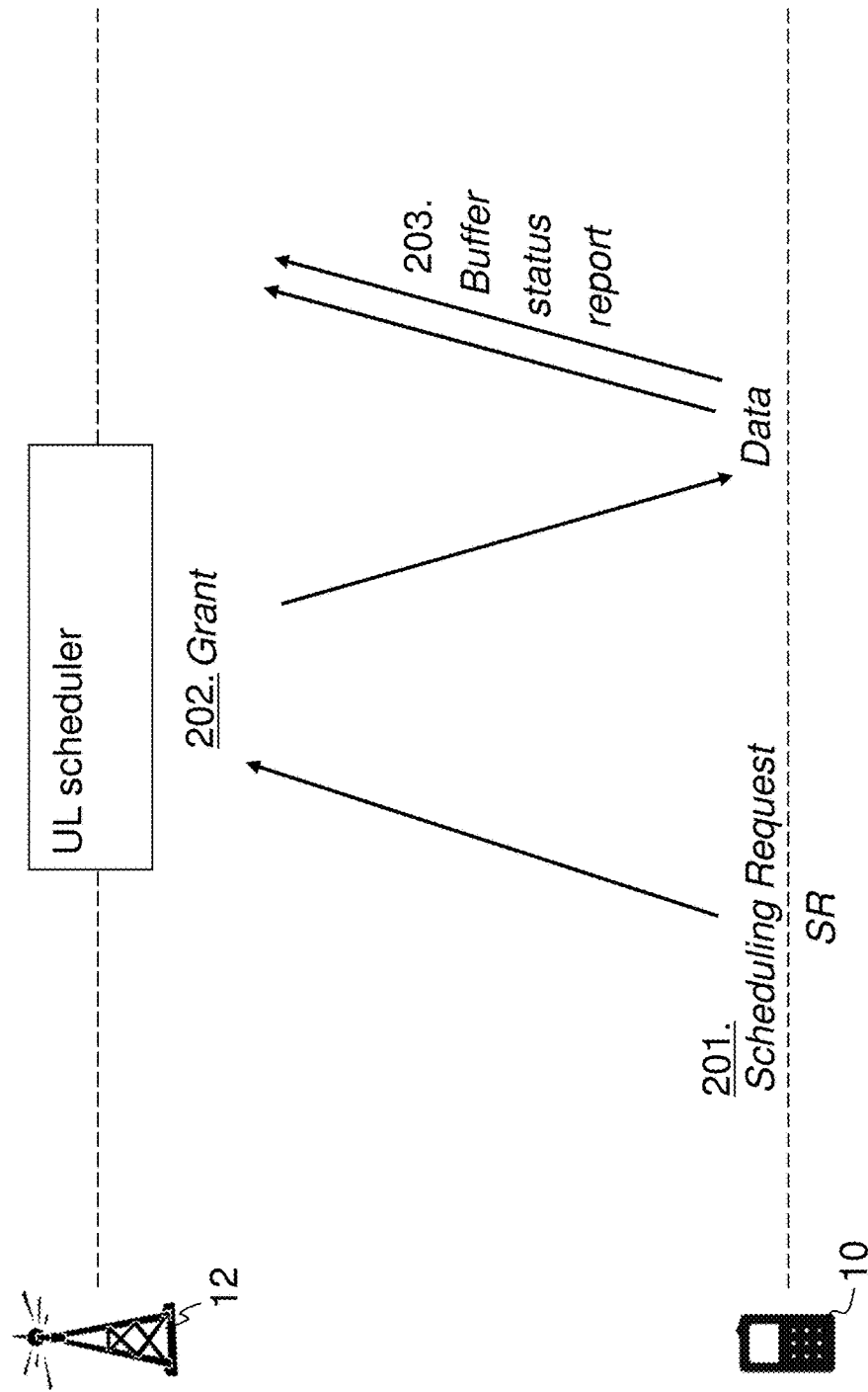
FIG. 2 shows a transmission procedure according to some embodiments herein.

The UL scheduling procedure or an uplink data transmission procedure in LTE is shown in FIG. 2. When new data arrives to an empty wireless terminal buffer or data that belongs to a higher priority logical channel group than existing data, arrives at the wireless terminal 10, the wireless terminal 10 triggers a regular BSR to report a buffer size or amount of data of the wireless terminal 10 stored for an uplink data transmission. If the wireless terminal 10 does not have UL resources to transmit the BSR, it triggers a SR.

Action 201. The wireless terminal 10 transmits a SR to the first radio base station 12. The SR may be sent on a dedicated SR channel (D-SR) or on the contention based Random Access Channel if the wireless terminal 10 is not configured with the D-SR resources on a Physical Uplink Control Channel (PUCCH).

Action 202. When the first radio base station 12 has received the SR, the first radio base station 12 may schedule the wireless terminal 10 and transmit a grant such as an initial grant.

Action 203. Using the initial grant, the wireless terminal 10 may finally transmit the BSR based on the initial grant. In the BSR, a Buffer Size field identifies a total amount of data available for uplink data transmission. Reporting may be done per Logical Channel Groups (LCG), which are configured with an RRC protocol. Typically Logical Channels having a same priority are grouped to one group. All buffered bits on a RLC layer and a Packet Data Convergence Protocol (PDCP) layer are counted for the BSRs. A purpose of a multiplexing/demultiplexing function is to multiplex MAC SDUs from one or different logical channels onto Transport Blocks (TB) to be delivered to a physical layer on transport channels, or demultiplex MAC SDUs from one or different logical channels from TBs delivered from the physical layer on transport channels. Logical channel prioritization (LCP) is a subtask of the multiplexing and demultiplexing functionality. The purpose here is to select MAC SDUs from different logical channels as well as MAC Control Elements (CE) to be transmitted with the grant provided by the physical layer for uplink direction. The multiplexing according to embodiments herein follows the static or the second configuration.

Dual Connectivity for e.g. LTE is Below Described

Figure 3:
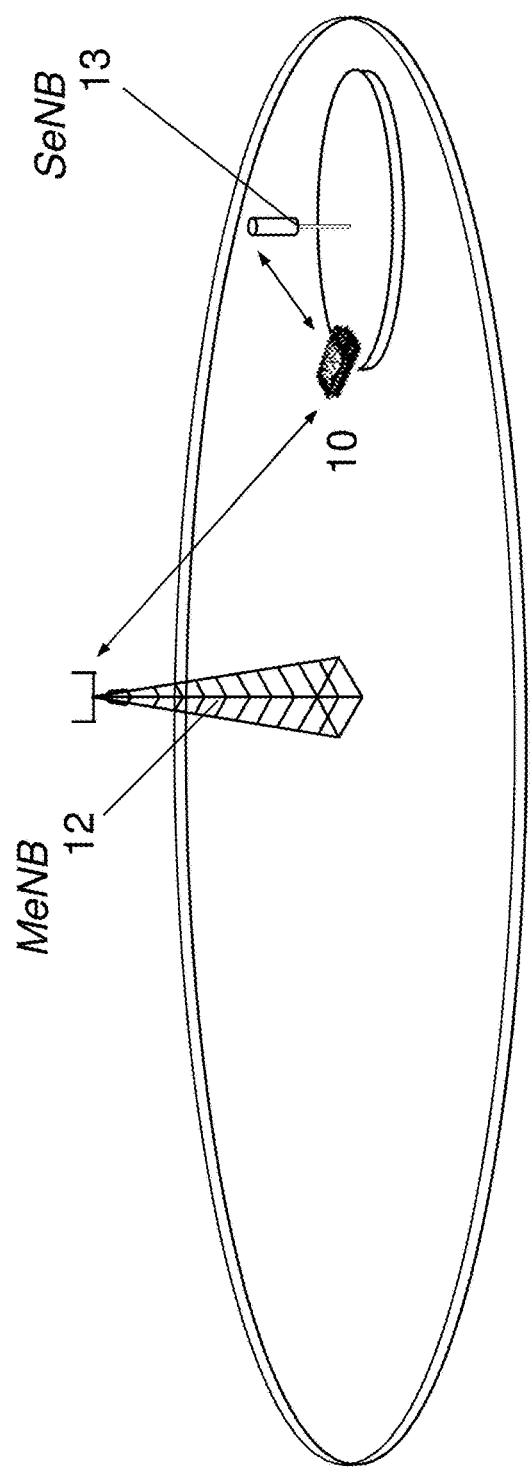
FIG. 3 shows a dual connectivity scenario according to embodiments herein.

As stated above, in the dual connectivity state the idea is that the wireless terminal 10 keeps connectivity to more than one radio base station at the time. Assuming that macro radio base stations are able to provide coverage and pico radio base stations are there only for capacity enhancements, e.g. covering coverage holes, one alternative architecture is where the wireless terminal 10 maintains a macro connectivity all the time, connected to the first radio base station 12 being a Master eNB (MeNB), and adds a pico connectivity when it is in the coverage area of the second radio base station 13 also referred to as being connected to a Secondary eNB (SeNB). When both connections are active or set up, the wireless terminal 10 may get data and/or control signaling from both radio base stations. This is illustrated in FIG. 3. FIG. 3 shows a Dual connectivity operation with the wireless terminal 10 having multiple connections with both the first radio base station 12 and the second radio base station 13. The first radio base station 12 may be the MeNB as illustrated, but it may be the other way around where the first radio base station 12 may be a SeNB.

There are currently different user plane architectures discussed to support the dual connectivity. These may be divided into two categories:

1. Inter-bearer split dual connectivity. In this alternative, data of a single Evolved Packet System (EPS) bearer is transmitted over a single radio base station that can be either the first radio base station 12 or the second radio base station 13. As stated above the first radio base station 12 may be a MeNB and the second radio base station 13 may be an SeNB. Shown in FIG. 4 and called "Option 1", a particular EPS bearer is routed from a serving gateway (S-GW) 41 to the wireless terminal 10 either via the first radio base station 12 or via the second radio base station 13 directly. In "Option 2" all the traffic, i.e., all EPS bearers are first routed to the first radio base station 12. Then traffic of EPS bearers are sent to the wireless terminal 10 either via the first base station 12 or second radio base station 13.

2. Intra-bearer split dual connectivity. In this alternative, data of a single EPS bearer may be transmitted over different radio base stations, that is, data is split over multiple radio base stations. This may be achieved e.g. by routing all traffic to the first radio base station 12 and then forwarding some of the packets of certain bearer over the second radio base station 13 as shown in "Option 3" and some packets directly to the wireless terminal 10.

Figure 4:
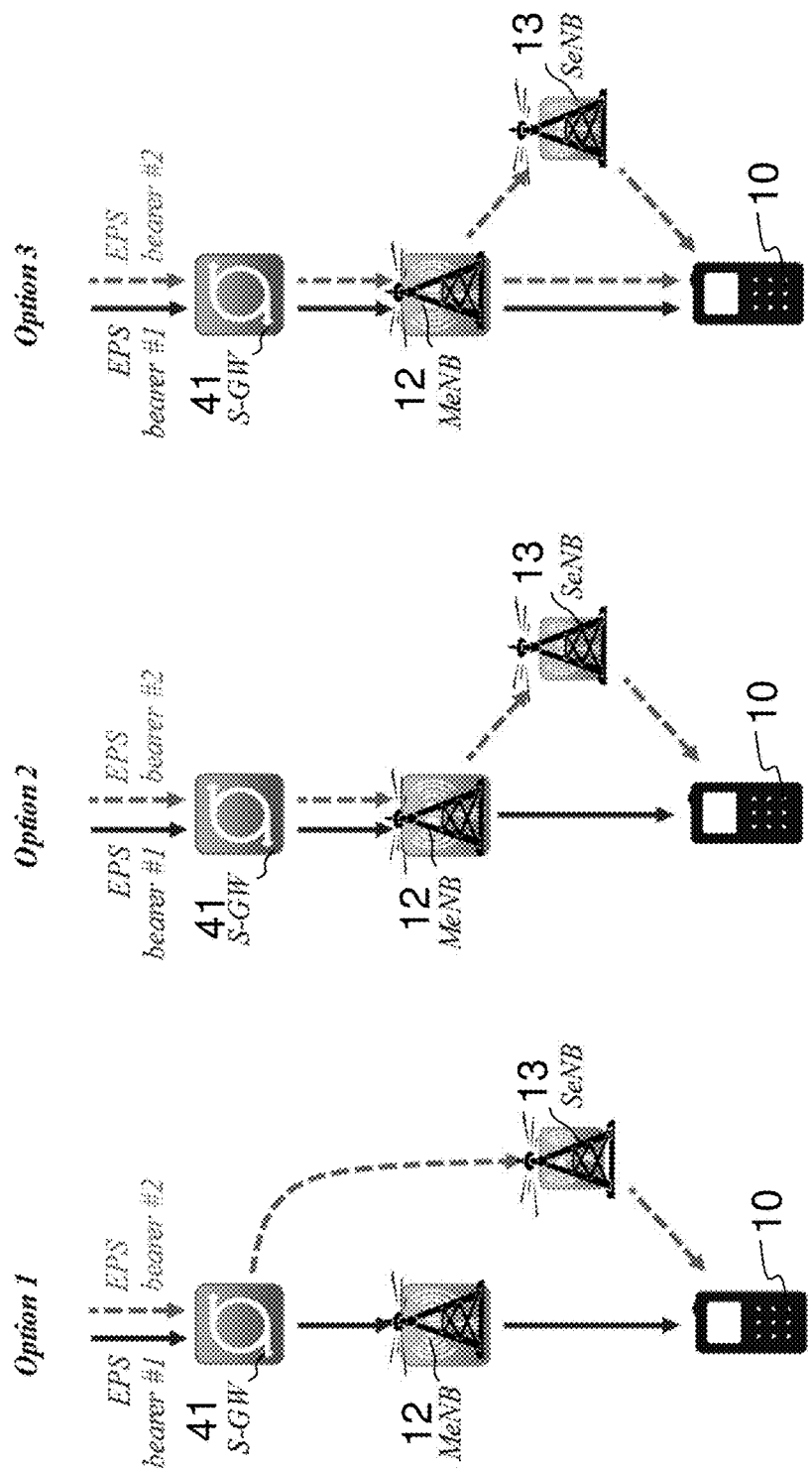
FIG. 4 shows different user plane architectures supporting the dual connectivity according to some embodiments herein.

The different schemes are depicted in FIG. 4. In the "Option 1", the traffic split is done per EPS bearer, EPS bearer #1 and EPS bearer #2, and traffic of each EPS bearer is directly routed from the S-GW 41 to the wireless terminal 10 either via the first base station 12 or the second base station 13. In "Option 2", also traffic split is done per EPS bearer. The difference is that all bearers are routed over the first radio base station 12. Finally in "Option 3", there are some bearers routing over the first radio base station 12 directly to the wireless terminal 10 and some of the bearers of the EPS bearers #2 are split over the first radio base station 12 and the second radio base station 13.

Figure 5:
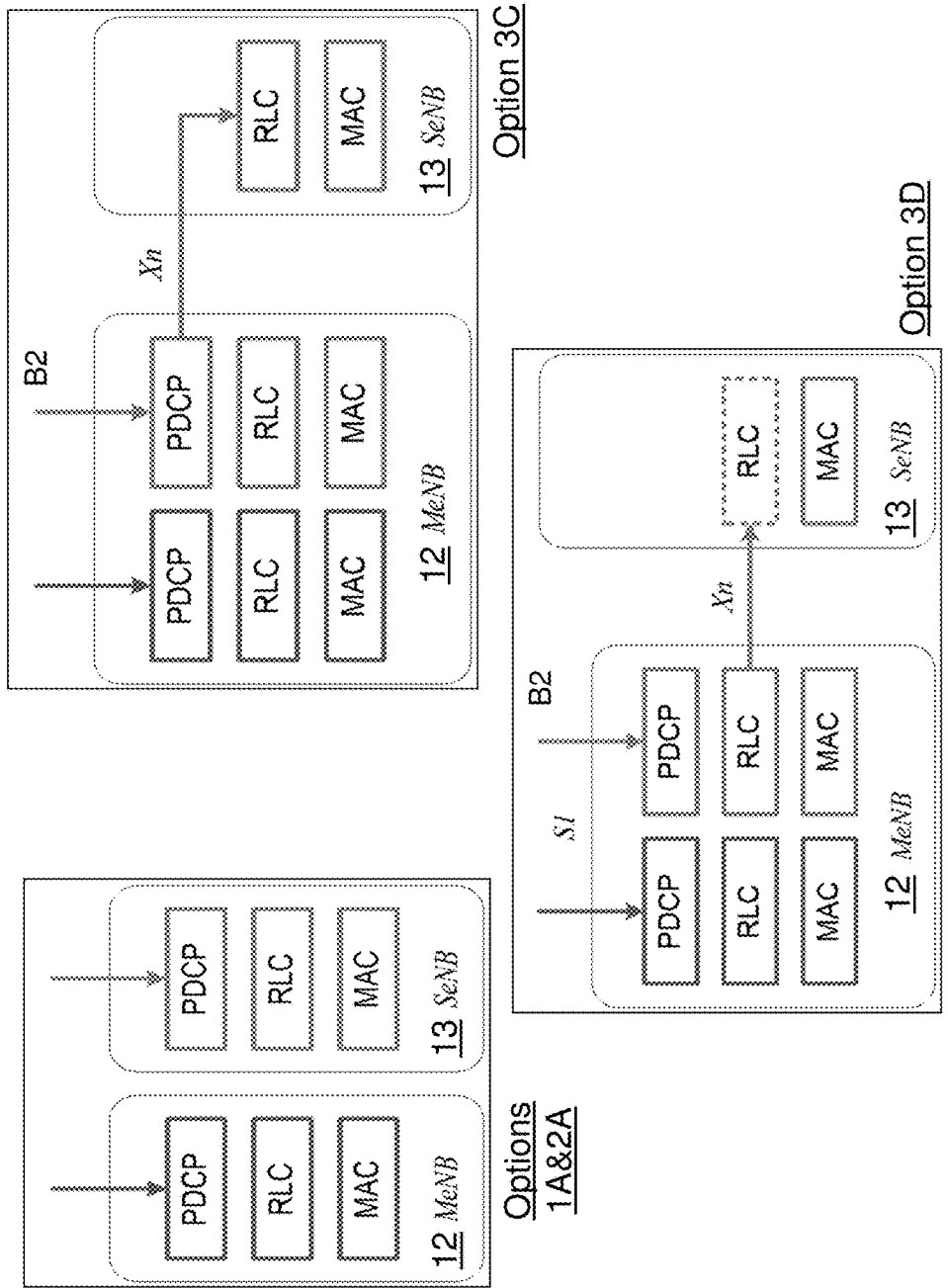
FIG. 5 shows protocol stacks according to different architectures.

A possible L2 protocol stack for Option 1 and 2 is depicted in top left of FIG. 5. It should be noted that all L2 protocols terminate in one radio base station only, either the first radio base station 12 or the second radio base station 13. Then in the right hand side of FIG. 5 and the bottom of FIG. 5, potential protocol stacks for Option 3, called "intra-bearer split", are depicted. In the protocol stack on the right hand side, denoted as Option 3C, for split bearers there is one PDCP entity in the first radio base station 12 whereas traffic is split under the PDCP layer meaning that there are different RLC entities in the each radio base station. In the protocol stack in the bottom of FIG. 5, denoted as Option 3D, traffic is split in the RLC layer in such way that an RLC entity in the first radio base station 12 handles some functions like reordering and then a slave RLC entity in the second radio base station 13 handles some other functions like re-segmentation of RLC Protocol Data Units (PDU) to fit to the transport blocks provided by the Medium Access Control (MAC)/Physical (PHY) layer. Thus, FIG. 5 discloses L2 protocol stack options for different user plane options, such as Options 1 and 2, also called option 1A and option 2A, and Options 3C and 3D.

Figure 6:
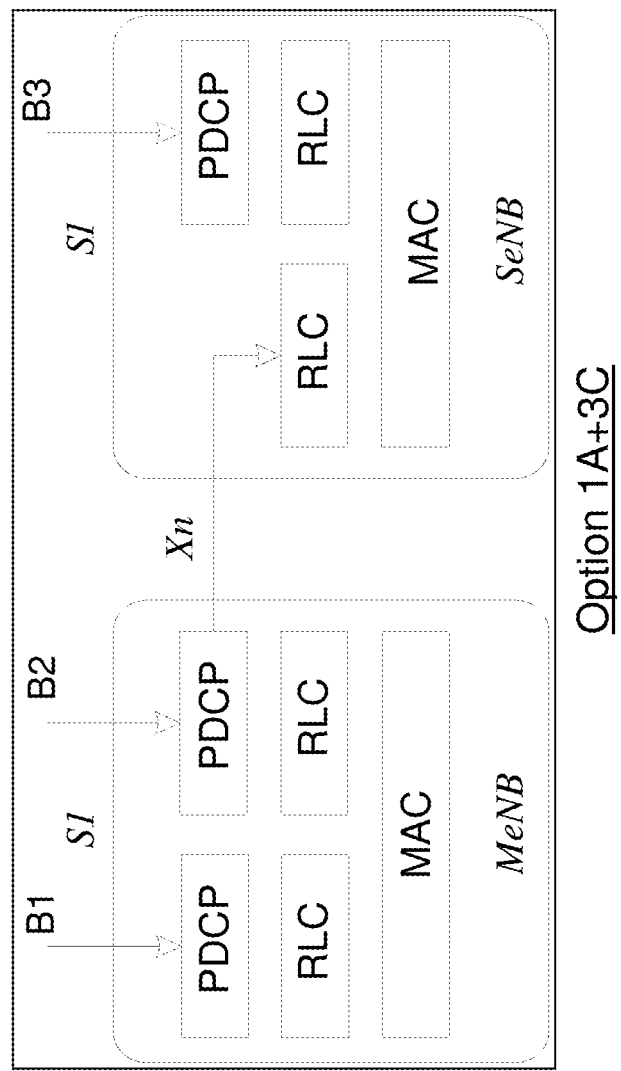
FIG. 6 shows a protocol stack according to some embodiments herein.

Embodiments herein focus on options 1 and 3 also called 1A and 3C. A joint architecture is shown in FIG. 6 below combining both architectures. FIG. 6 shows L2 protocol stack options when user plane options 1A and 3C are used. Buffer status reporting supporting uplink data transmissions and logical channel prioritization is not sufficient when considering dual connectivity operation as the current mechanism is intended to be used with one connection only. Embodiments herein disclose different ways to report buffer status in the dual connectivity scenario.

In FIGS. 5 and 6 above it can be seen that there are two types of bearers:

1. A first type. Bearers being transmitted over one radio base station. In architecture Options 1 and 2 or 1A and 2A, the bearers are mapped to either the first radio base station 12 or the second radio base station 13, whereas in architecture of Option 3C and Option 3D, these type of bearers are mapped only to the first radio base station 12. Examples of such bearers are given in FIG. 6 where a first bearer B1 is mapped to the first radio base station 12 and a third bearer B3 is mapped to the second radio base station 13.

2. A second type. Bearers split over multiple radio base stations. The packets of these bearers may be sent over the second radio base station 13 and/or the first radio base station 12. Examples of such bearers are shown in FIGS. 5 and 6 denoted as a second bearer B2.

The first type bearers are herein called "eNB-specific bearers", B1 and B3, and the second type of bearers are herein called "split bearers", B2.

Furthermore, it should be assumed that all Radio Link Control acknowledged mode (RLC AM) bearers are two-directional as UL is needed at least for RLC control information with all User Plane (UP) architectures except with architecture Option 3D.

It should be noted that in the following description, embodiments and/or rules for buffer status reporting may be described either in the terms of bits or bytes. It should be also noted that in the following description, a configuration can be achieved either over air e.g. with RRC protocol or it can be static configuration or preconfigured to the wireless terminal 10.

Figure 7:
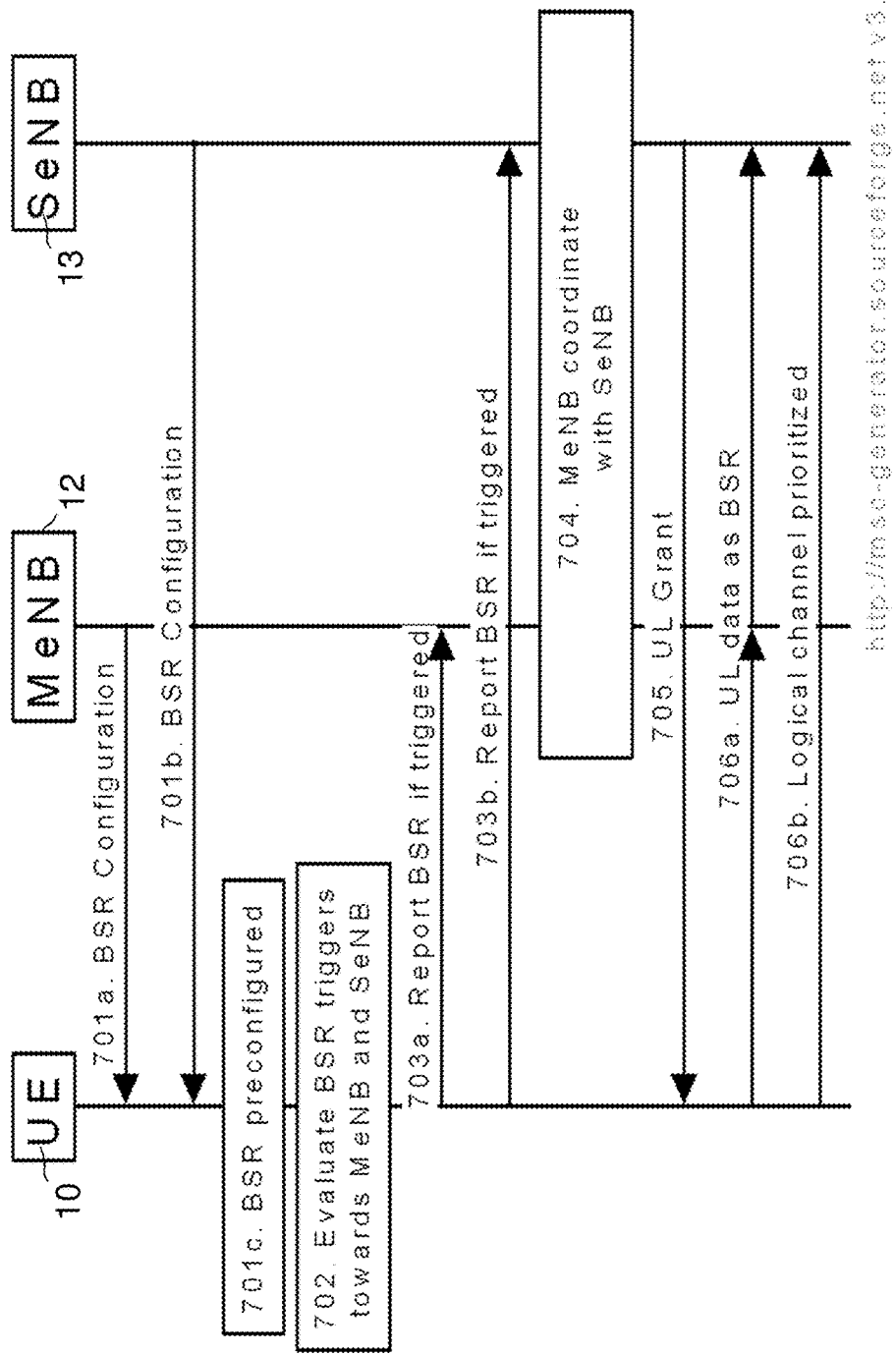
FIG. 7 is a signalling scheme depicting a method according to some embodiments herein.

A reconfigurable buffer status reporting procedure for both eNB specific bearers and split bearers, the entities to which the bearers are mapped are called logical channels, is illustrated in FIG. 7. FIG. 7 shows a signalling chart for dual connectivity buffer status reporting and UL data transmissions. One of the serving radio base stations, e.g. the first radio base station 12 or the second radio base station 13, or both may configure buffer status reporting, or the buffer status reporting may be pre-configured.

Action 701a. For dual connectivity, according to some embodiments, the first radio base station 12, being exemplified as an MeNB, configures the buffer status reporting at the wireless terminal 10 by transmitting to the wireless terminal 10, a BSR configuration for the first and/or the second radio base station.

Action 701b. Alternatively, or additionally, the second radio base station 13, being exemplified as an SeNB, may configure the buffer status reporting for the second radio base station 13 and/or the first radio base station 12. Hence, the second radio base station 13 may transmit BSR configuration to the wireless terminal 10 for the first radio base station 12 and/or the second radio base station 13.

Action 701c. Alternatively, or additionally, the wireless terminal 10 may be preconfigured with the BSR configuration for one or both of the radio base stations.

Action 702. The wireless terminal 10 may evaluate or monitor, in action 702, BSR triggers towards the first radio base station 12 and/or the second radio base station 13. E.g. monitors whether a trigger condition is fulfilled regarding one of the radio base stations or not.

Action 703a. If a BSR is triggered towards one or more of the serving radio base stations, then the BSR is sent to the corresponding radio base station. Thus, the wireless terminal 10 may report BSR to the first radio base station 12 if triggered.

Action 703b. Additionally or alternatively, the wireless terminal 10 may report BSR to the second radio base station 13 if that trigger condition is fulfilled.

Action 704. In some embodiments, the first radio base station 12 and the second radio base station 13 may then coordinate one or more scheduling decisions for UL transmission from the wireless terminal 10 based on the received BSR or BSRs. The coordination is performed to avoid that there is a risk that the wireless terminal 10 is scheduled over multiple cells and radio resources are wasted.

Action 705. The first radio base station 12 may then schedule the wireless terminal 10 and transmit an UL grant to the wireless terminal 10 based on e.g. the coordinated scheduling decision.

Action 706a. The wireless terminal 10 then handles multiplexing of the uplink data transmission towards the first and second radio base stations according to a static configuration defining how to multiplex MAC SDUs from one or different logical channels onto transport blocks to be delivered to a physical layer on transport channels of a given radio base station out of the first radio base station and the second radio base station.

Action 706b. Additionally or alternatively, the wireless terminal 10 handles multiplexing of the uplink data transmission towards the first radio base station and the second radio base station according to a second configuration where if there is data available for multiple logical channels with equal priority towards one of the radio base stations, then data of a logical channel for which the buffer status report is configured towards a radio base station providing a grant, is prioritized.

Procedures for eNB-Specific Bearers Described for "Option 1" and "Option 2" Above For the eNB-specific bearers, the goal is that all data of those bearers are transmitted and scheduled over one radio base station. First considering BSR triggering and reporting: Currently BSRs are reported per logical channel group. It may be made sure that correct radio base station receives the information of the buffered bytes, information also known as BSR, for a certain bearer. For this, following solutions may be used:

Allocate, at the wireless terminal 10, bearers of different radio base stations to different logical channel groups based on received configuration.

When reporting buffer status, the wireless terminal 10 considers which bearers belong to which radio base station and builds BSRs correspondingly. Hence, first the wireless terminal 10 checks which bearers are mapped to a certain radio base station and then includes data amount of these bearers in the BSR towards that radio base station.

After triggering the BSR, SR is typically triggered. To make the correct radio base station to be aware of incoming bits, SR may be sent towards the radio base station for which the BSR is relevant.

When the wireless terminal 10 receives a grant to the SR from the relevant radio base station, then it may report the BSR with it. To minimize the user plane delay, it is beneficial that the BSR ends up to the correct radio base station. Thus, a logic is introduced to map a BSR Medium Access Control (MAC) Control Element to the correct Physical Layer (PHY) grant provided for the given bearer. In addition, when the wireless terminal 10 receives a grant for data, then also usage of grant provided by a given radio base station is limited to the corresponding bearer mapped to this same radio base station. This is different as compared to intra-eNB Carrier Aggregation (CA), where it is up to wireless terminal implementation how grants are used. Association between grants of physical layer resources of one base station and bearers corresponding to the same base station may be done semi-permanently with Radio Resource Control (RRC) configuration.

Procedures for Split Bearers Described for Options 3C and 3D Above and Combination of Options 1A and 3C The UL scheduling, also referred to as UL data transmissions, and buffer status reporting are more complex with split bearers. In this scenario, the first question is how BSRs and SRs are triggered and towards which radio base station the BSRs and SRs are sent. After that, one or two radio base stations may schedule the wireless terminal 10 with the UL grants. The second open question, and being the one embodiments herein solve, is: when the wireless terminal 10 has received a grant, how does the wireless terminal 10 map data to the grant?

Starting with BSR triggering, the following examples are described:

Solution 1) All BSRs and SRs are triggered and sent towards all radio base stations, relevant for split bearers, e.g. the first radio base station 12 and the second radio base stations 13.

Solution 2) BSR and SR are triggered and sent towards one radio base station only, for example the first radio base station 12 being exemplified above as the master radio base station (MeNB).

Solution 3) BSR and SR are triggered and sent toward one radio base station or two radio base stations based on one or more predefined rules.

Thus, embodiments herein disclose that the wireless terminal 10 transmits a BSR to the first and/or second radio base station when a trigger is being fulfilled as configured at the wireless terminal 10.

The first option, Solution 1, is non-complex from a wireless terminal point of view. A network implementation may be provided on how to schedule the wireless terminal 10. However, the issue with this option, Solution 1, is that the second radio base station 13 and the first radio base station 12 need to coordinate before scheduling resources for the wireless terminal 10. Otherwise there is a risk that the wireless terminal 10 is scheduled over multiple cells and radio resources are wasted, called a double scheduling problem. See action 704 above.

In the second option, Solution 2, the double scheduling problem is avoided as only one radio base station is responsible for handling BSRs and SRs. Even in this case, scheduling over the second radio base station 13 could be possible if scheduling information is forwarded from the first radio base station 12 to the second radio base station 13. However, the limitation of this approach is that some packets that are needed in the second radio base station 13 are delayed in case the first radio base station 12 handles the BSRs and SRs. An example of such data is RLC Status Report for the RLC entity of the second radio base station 13 in e.g. Architecture option 3C. It would be more efficient to report and transmit those RLC Status reports directly to the second radio base station 13 than to forward the packet or BSR over the backhaul via the first radio base station 12.

In the third option, Solution 3, there are one or more predefined rules how BSRs and SRs are triggered and transmitted. The rules may be one or more of the following:

In architecture 3C, one rule may be that the BSR due to RLC Status Report is triggered and transmitted to the radio base station terminating the corresponding RLC. This makes sure that the control information is received with the minimum delay in the right radio base station. In addition, bytes related to RLC retransmissions are reported to the radio base station terminating the corresponding RLC. Bytes pertaining to new uplink data transmission is reported directly to e.g. a master radio base station such as the first radio base station 12.

An alternative or additional rule may be that when the UL buffer exceeds a given threshold X, the BSRs are sent to multiple radio base stations, e.g. the first and second radio base station. Otherwise the BSRs are only sent to a MeNB such as the first radio base station 12.

a. In one mode, the wireless terminal 10 receives from one of the serving radio base stations, for example the first radio base station 12 a rule configuration how to trigger the BSR.

b. The rule configuration or a BSR triggering rule may be different for different radio base stations and/or logical channel groups. For example, there may be one threshold Xm for triggering BSR reports to the first radio base station 12 and one threshold Xs for triggering BSR reports to the second radio base station 13. A BSR towards a radio base station may be triggered only when the buffer size is over the threshold of this base station. The Xm and Xs may be the same or different.

c. The rule configuration or the BSR triggering rule may be considering different bits in the UL buffer, as configured from one of the serving radio base stations, for example the first radio base station 12. One example is to consider all bits 'B' in an UL buffer of the wireless terminal 10. Another example is to consider a fraction Ym of the bits in the UL buffer for evaluating BSR triggering towards the first radio base station 12 and a fraction Ys of the bits in the UL buffer evaluating BSR triggering towards the second radio base station 13.

d. The considered bits and triggering rules may be further separately configured per bearer and/or logical channel group.

Yet another rule may be that Transmission Control Protocol (TCP) acknowledgements (ACK) are reported and sent directly to the first radio base station 12. By this way, a TCP roundtrip time is minimized as it avoids forwarding TCP ACKs over the backhaul between second radio base station 13 and the first radio base station 12. Other payload data may be sent to the second radio base station 13 as well.

Then when BSR is triggered, it is preferable to send SR only to the radio base station for which BSR was triggered e.g. the second radio base station 13. Usage of the initial grant may follow BSR reporting. E.g. if the BSR for the RLC Status report is sent towards the second radio base station 13, then also actual data may be sent towards that second radio base station 13 according to the static or second configuration when the wireless terminal 10 is scheduled with UL resources. By this way, a situation where the wireless terminal 10 makes transmission towards wrong radio base station resulting in a potential padding, is avoided.

It should be noted that for padding BSR and periodic BSR there may be exceptions. For example, padding and periodic BSRs may be sent only to the one radio base station or alternatively, padding and periodic BSRs may be sent to all radio base stations.

Content of the Buffer Status Report for Split Bearers is Described Below

In case a BSR is sent to many radio base stations there can be additional rules what to report to each radio base station.

1. Report all bits of a given bearer/logical channel to all radio base stations. Then it is up to radio base stations to coordinate how to schedule the wireless terminal 10. There can be exceptions for RLC status reports and retransmissions, e.g. exclude bits related to RLC status reports and retransmissions
2. Report all bits of a given bearer/logical channel to all radio base stations, but indicate in the BSR what bits have been reported to the other radio base station. Then the other radio base station, e.g. the second radio base station 13, knows what another radio base station, e.g. the first radio base station 12, may schedule.
3. Report a fraction Z of the total number of bits of a given bearer/logical channel to one radio base station and rest of the bits to another radio base station. Fractions how to split the total no of bits may be configured by the network, for example by the first radio base station 12. For example, fraction Zm of the bits are reported to the first radio base station, while fraction Zs of the bits are reported to the second radio base station 13. In addition, bits reported to one radio base station may also be reported to a different radio base station as described above. Alternatively, the estimated link rate and throughput may be utilized when determining the fraction how to split the bits. In addition, there can be new rules where new data would be reported to the first radio base station 12 and RLC Status report and retransmission related data to the second radio base station 13.

Procedures for Multiplexing and LCP for eNB-Specific Bearers

In dual connectivity, it should be made sure that MAC SDUs corresponding to a logical channel associated with a certain radio base station, such as the first radio base station 12, are also mapped to the physical layer channels and grants of the same certain radio base station.

For the eNB-specific bearers, bearer type 1 and 2, Logical Channel Prioritization (LCP) is straightforward. There the wireless terminal 10 has one logical channel per radio bearer in one of the MAC entities. As stated above for multiplexing/demultiplexing functionality, MAC SDUs of a logical channel is mapped to the grants provided by the corresponding radio base station.

Procedures for Multiplexing and LCP for Split Bearers

It should be made sure that for split bearers, MAC SDUs due to RLC status reports are multiplexed to the correct radio base station where the RLC entity is located.

For the split bearers LCP needs to be taken into consideration. For each radio bearer, there is a Prioritized Bit Rate (PBR) configured. The wireless terminal 10 have been allocated grants by the radio base station to the logical channel to satisfy this bitrate. When the radio bearer is mapped multiple MAC entities and logical channels, it should be made sure that this split bearer uses radio resources over two radio base stations corresponding to the PBR built and not more. This can be achieved in that the PBR is an accumulated sum over the transmission towards different radio base stations and potentially different MAC entities for those radio base stations. When the wireless terminal has provided BSR to the network, such as the first radio base station 12 or an RNC, it will be typically scheduled and uplink grants or UL data transmission grants are provided. Currently it is not specified exactly how the wireless terminal 10 maps MAC SDUs of different logical channels to the physical layer grants. LCP just determines a priority order of different logical channels and there are limits on how much resources may be allocated to Logical Channels (LCH) but actual mapping e.g. when the wireless terminal 10 receives grants for multiple cells is up to wireless terminal implementation.

As part of developing embodiments herein a problem has been identified. Even if the wireless terminal 10 sends the BSR towards the configured radio base station only, e.g. MeNB or SeNB, it can be that the wireless terminal 10 is scheduled over multiple radio base stations. If the wireless terminal 10 is configured with both, or one of, eNB-specific and split bearers, a following scenario may take place as depicted in FIG. 8.

Figure 8:
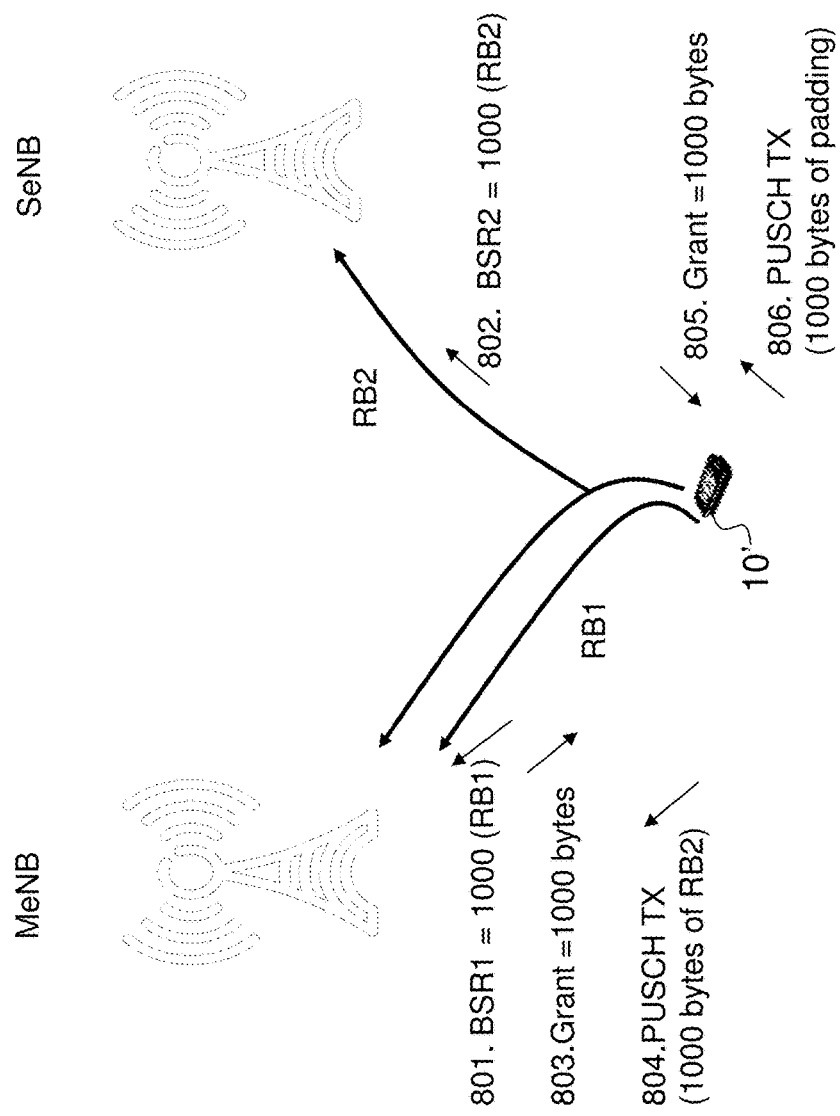
FIG. 8 is a schematic overview depicting a problem discussed herein.

In FIG. 8 a wireless terminal 10' is configured with an eNB-specific bearer RB1 mapped only to a Master eNB (MeNB) and with a split bearer RB2 mapped both to the MeNB and a Secondary eNB (SeNB). BSR reporting from the wireless terminal 10' of the RB1 is configured towards the MeNB, and BSR reporting from the wireless terminal 10' of the RB2 is configured towards the SeNB. Assume that the '1000' bytes of data arrives for both bearers RB1 and RB2 simultaneously. For RB1, the wireless terminal 10' sends, action 801, a first BSR, BSR1, towards the MeNB and for RB2, the wireless terminal 10' sends, action 802, a second BSR, BSR2, towards the SeNB. Action 803, first the wireless terminal 10' is scheduled with a grant of '1000' bytes from the MeNB. If multiplexing of MAC SDU is up to wireless terminal implementation, then the wireless terminal 10' may select data of RB2 and then sends, action 804, data of that bearer RB2 with the grant from the MeNB, over a Physical Uplink Shared Channel (PUSCH). Later on, the wireless terminal 10' receives, action 805, a grant of '1000' bytes from the SeNB. However, now there is no data left for any bearers mapped to the SeNB but only for the MeNB. Thus the wireless terminal 10' sends, action 806, a padding to the SeNB. Data of RB1 gets stuck in the wireless terminal 10' until the MeNB receives new information via e.g. periodic BSRs.

Figure 9:
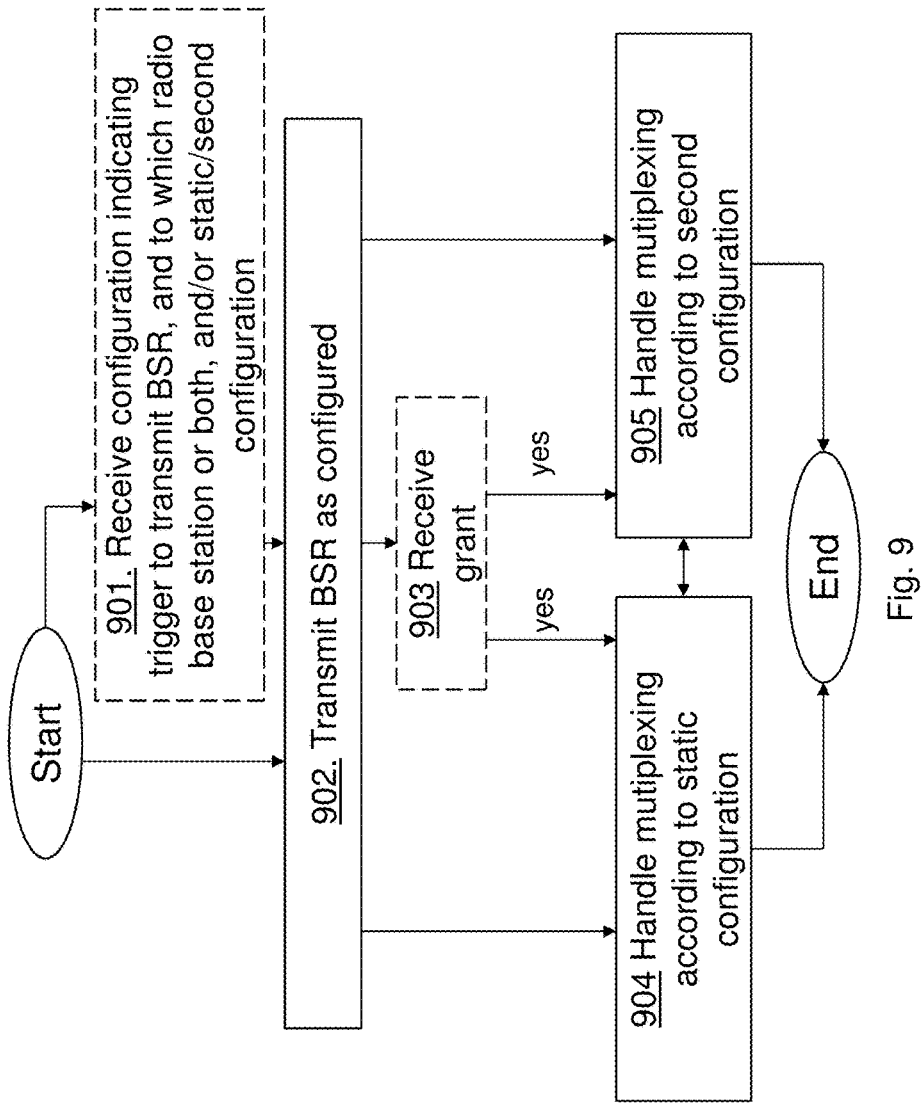
FIG. 9 is a flowchart depicting a method in a wireless terminal according to embodiments herein.

According to embodiments herein this is solved by handling multiplexing in certain manners. FIG. 9 discloses a method performed by the wireless terminal 10 for managing or handling data transmissions in the radio communications network 1. The wireless terminal 10 is served by the first radio base station 12 and the second radio base station 13 providing dual connectivity to the wireless terminal 10 in the radio communications network 1.

Action 901. The wireless terminal 10 receives configuration from at least one of the radio base stations indicating a trigger to transmit a buffer status report and to which radio base station out of the first radio base station and the second radio base station, or to both. The wireless terminal 10 may further receive the static configuration and/or the second configuration from at least one of the radio base stations. The wireless terminal may then be configured accordingly.

Action 902. The wireless terminal 10 transmits a BSR for an uplink data transmission to the first and/or second radio base station when a trigger is being fulfilled as configured at the wireless terminal 10.

Action 903. The wireless terminal 10 may then receive a grant. The grant being provided from at least one of the radio base stations out of the first radio base station and the second radio base station.

Action 904. The wireless terminal 10 then handles multiplexing of the uplink data transmission, e.g. of a split bearer, towards the first and second radio base stations according to a static configuration defining how to multiplex MAC SDUs from one or different logical channels onto transport blocks to be delivered to a physical layer on transport channels of a given radio base station out of the first radio base station 12 and the second radio base station 13.

Hence in some embodiments, the problem described here is solved by using a static configuration how to multiplex MAC SDUs of certain logical channels, or radio bearers, to the physical layer grants of a given radio base station. The static configuration may be achieved with RRC and per logical channel, or radio bearer. The static configuration may be the same as used to configure BSR reporting, actions 901/902, for that logical channel implying that UL data transmission is always sent towards the same radio base station as the BSR, related to the same bearer, was sent to. For example regarding action 904 with reference to the problem described in FIG. 8, the wireless terminal 10 will transmit the data of the logical channel to the same radio base station as BSR, related to the same logical channel, was sent to, i.e. the wireless terminal 10 receives a grant from the MeNB for the BSR1 related to the logical channel of radio bearer RB1 and the wireless terminal 10 will transmit the '1000' data of the logical channel of RB1 to the MeNB as BSR1 was transmitted to the MeNB. In this embodiment, this fixed configuration is always followed, meaning that if there would not be data available for two logical channels simultaneously, still multiplexing is done using same fixed configuration, i.e., in FIG. 8, data of logical channel corresponding to RB1 is sent to the MeNB and data of the logical channel corresponding to RB2 is sent to the SeNB.

Action 905. The wireless terminal 10 may additionally or alternatively handle multiplexing of the uplink data transmission, e.g. of a split bearer, towards the first and second radio base stations according to the second configuration where if there is data available for multiple logical channels with equal priority towards one radio base station, then data of a logical channel for which the buffer status report is configured towards the radio base station providing a grant, is prioritized. The bearer may be split into two logical channels to a respective radio base station out of the two radio base stations. So for example regarding action 905 with reference to the problem described in FIG. 8, as there are data available for multiple logical channels, the wireless terminal 10 will prioritize data of the logical channel for which bearer is configured towards the radio base station providing grant, i.e, the wireless terminal 10 will transmit the '1000' data of the logical channel of RB1 to the MeNB as BSR1 was transmitted to the MeNB. However, if there is data available only for one logical channel, then the wireless terminal 10 may transmit data of that channel to the radio base station even if there is no BSR configured for the same radio base station. In the example of FIG. 8, this would mean that the wireless terminal 10 may send data of RB2 to either MeNB or SeNB if granted with the uplink grant.

Hence, in some embodiments, alternatively or additionally to the embodiments mentioned in action 904, the second configuration defines that when there is data available for multiple logical channels, or radio bearers, with equal priority towards one radio base station, then data of the logical channel for which the BSR is configured towards the radio base station providing the grant, action 903 above, is prioritized. Strict prioritization may be applied where always data of the logical channel for which BSR is configured, is prioritized e.g. when there is data available for multiple bearers with equal priority. Alternatively prioritization may be applied until the number of bytes corresponding to the BSR sent towards the radio base station providing the grant, is reached. This enhances that the grant is utilized for the correct radio base station.

Both these solutions mentioned in action 904 and 905 make sure that there is no risk that the wireless terminal 10 multiplexes data towards wrong radio base station which is not intended to schedule transmission for the wireless terminal 10. With these solutions there should not be either risk of dead-lock situation where the wireless terminal 10 is forced to send padding towards one radio base station whereas another radio base station does not know that the wireless terminal 10 has pending data in the buffer. For example regarding action 905 with reference to the problem described in FIG. 8, as the wireless terminal 10 receives the grant from the MeNB, the wireless terminal 10 will priorities the data for RB1 and transmit that 1000 to the MeNB.

For split bearers, BSR and SR due to RLC status reports and RLC retransmissions of the RLC entity in a given eNB, such as the MeNB or SeNB, may be sent from the wireless terminal 10 towards that given eNB. In the multiplexing and LCP entity, the wireless terminal 10 may map data due to RLC status report and RLC retransmission to the grants provided by the corresponding eNB in which the corresponding RLC is located. For split bearers, BSRs and SRs due to new data are only reported from the wireless terminal 10 to the eNB that is configurable by the network. In some embodiments the static configuration defines that multiplexing MAC SDUs to the physical layer grants, by the wireless terminal 10, may follow a fixed RRC configuration which is same as used for BSR reporting. Hence, there may be a fixed mapping solution of UL data mapping to one radio base station according to a fixed configuration or ratio, and/or a solution where there is no fixed mapping, but the logical channel for which the BSR can be triggered and for which a grant is provided, is prioritized. This solution makes sure that there is no risk that the UE multiplex data towards wrong radio base station and there should not be risk of dead-lock situation where the wireless terminal is forced to send padding to a radio base station wasting radio resources.

Figure 10:
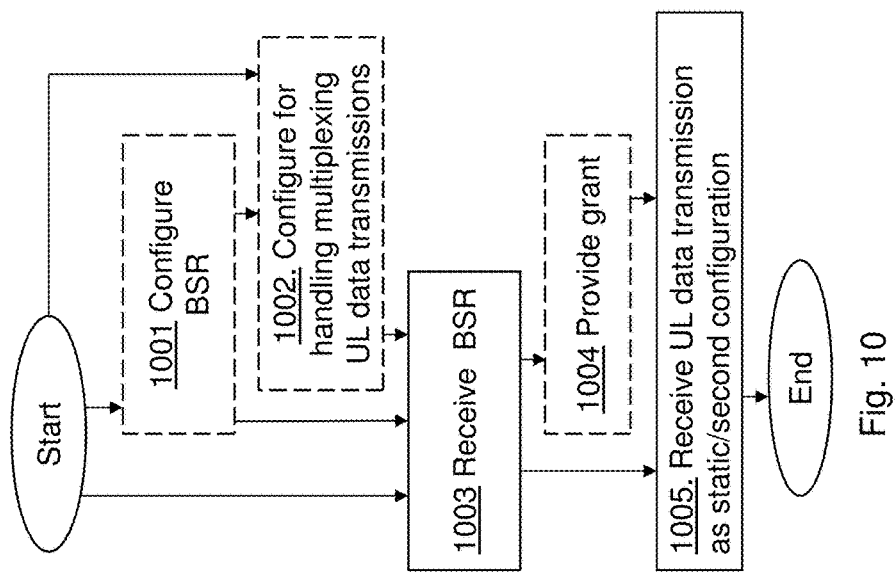
FIG. 10 is a flowchart depicting a method in a radio base station according to embodiments herein.

According to embodiments herein the above problem in FIG. 8 is solved by handling multiplexing in certain manners. FIG. 10 discloses a method performed by a radio base station such as the first radio base station 12 or the second radio base station 13 for handling an uplink data transmission from the wireless terminal 10 in the radio communications network 1. The radio base station is one radio base station out of at least two radio base stations serving the wireless terminal 10 providing dual connectivity to the wireless terminal 10 in the radio communications network 1.

Action 1001. The radio base station may configure the wireless terminal 10 for performing reporting of the BSR to the radio base station, e.g. the first radio base station 12, and/or another radio base station, e.g. the second radio base station 13, out of the at least two radio base stations, when a trigger is being fulfilled. This may be preconfigured at the wireless terminal 10.

Action 1002. The radio base station may configure the wireless terminal 10 for handling multiplexing of the uplink data transmission according to the static configuration and/or the second configuration. The static configuration defines for the wireless terminal 10 how to multiplex MAC SDUs from one or different logical channels onto transport blocks to be delivered to a physical layer on transport channels of a given radio base station out of the at least two radio base stations. The second configuration states that if there is data available for multiple logical channels with equal priority towards one of the radio base stations, then data of a logical channel for which the buffer status report is configured towards a radio base station providing a grant, is prioritized. This may be preconfigured at the wireless terminal 10. A bearer may be split into two logical channels to a respective radio base station.

Action 1003. The radio base station receives the BSR from the wireless terminal 10 indicating that the trigger is fulfilled for reporting the BSR.

Action 1004. The radio base station may provide the wireless terminal 10 with a grant.

Action 1005. The radio base station receives the uplink data transmission multiplexed according to: the static configuration and/or the second configuration.

Figure 11:
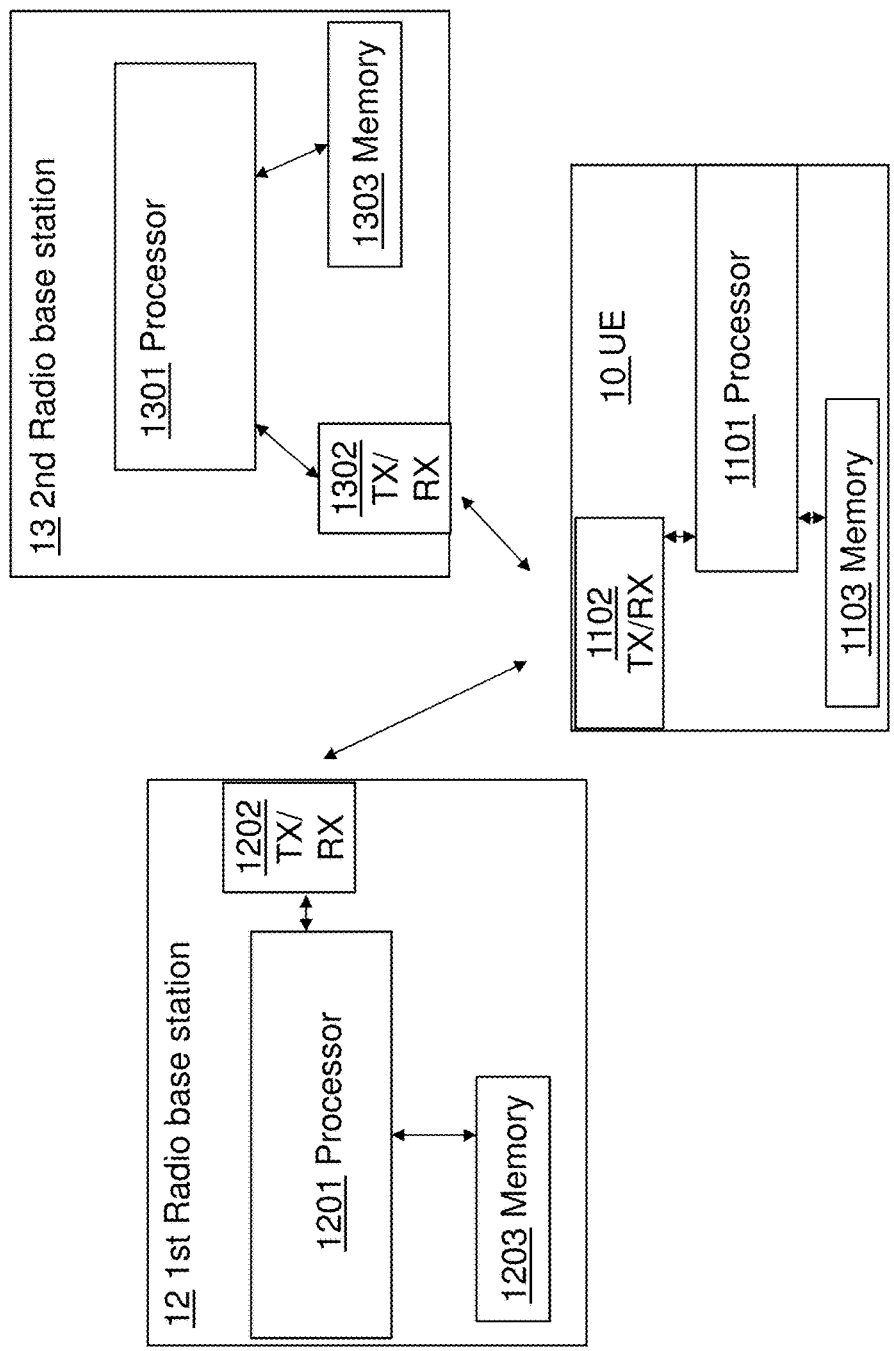
FIG. 11 is a block diagram depicting a first, second radio base stations and a wireless terminal according to embodiments herein.

According to embodiments herein a wireless terminal is provided to perform methods herein. Furthermore a first radio base station is provided. The first radio base station may be a Master radio base station or a secondary radio base station. The secondary radio base station may be a low power node, i.e. lower power transmissions compared to the master radio base station. FIG. 11 is a block diagram depicting the first radio base station 12, second radio base station 13 and the wireless terminal 10.

The embodiments herein for managing or handling data transmissions may be implemented through one or more processors 1101 or processing means in the wireless terminal 10 depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the wireless terminal 10. One such carrier may be in the form of a CD ROM disc. It is however feasible with other data carriers such as a memory stick. The computer program code may furthermore be provided as pure program code on a server and downloaded to the wireless terminal 10.

The wireless terminal 10 comprises a transmitter TX and a receiver RX or a transceiver 1102 for receiving e.g. BSR configurations from one or both radio base stations. The transceiver 1102 is further for transmitting a buffer status report when being triggered. The BSR may be transmitted to the first and/or the second radio base station e.g. depending on a condition has been fulfilled and type of bearer. The processor 1101 may be configured to handle multiplexing of the uplink data transmission towards the first and second radio base stations according to the static configuration defining how to multiplex MAC SDUs from one or different logical channels onto transport blocks to be delivered to a physical layer on transport channels of a given radio base station out of the first radio base station and the second radio base station; and/or according to the second configuration where if there is data available for multiple logical channels with equal priority towards one of the radio base stations, then data of a logical channel for which the buffer status report is configured towards a radio base station providing a grant, is prioritized.

The wireless terminal 10 further comprises a memory 1103. The memory may be used to store BSR configuration, configurations how to multiplex uplink data transmissions, buffer status, thresholds, application to perform the methods herein etc.

The embodiments herein for handling data transmissions may be implemented through one or more processors 1201 or processing means in the first radio base station 12 depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the first radio base station 12. One such carrier may be in the form of a CD ROM disc. It is however feasible with other data carriers such as a memory stick. The computer program code may furthermore be provided as pure program code on a server and downloaded to the first radio base station 12.

The first radio base station 12 comprises a transmitter TX and a receiver RX or a transceiver 1202 for transmitting e.g. BSR configurations to the wireless terminal 10. The transceiver 1202 is further configured to receive a buffer status report when being triggered at the wireless terminal 10. The transceiver may further be configured to receive an uplink data transmission multiplexed according to: a static configuration defining how to multiplex MAC SDUs, from one or different logical channels onto transport blocks to be delivered to a physical layer on transport channels of a given radio base station out of the at least two radio base stations; and/or a second configuration where if there is data available for multiple logical channels with equal priority towards one radio base station out of the at least two radio base stations, then data of a logical channel for which the BSR is configured towards a radio base station providing a grant, is prioritized.

The first radio base station 12 further comprises a memory 1203. The memory may be used to store BSR configuration, buffer status, thresholds, application to perform the methods herein etc.

The embodiments herein for handling data transmissions may be implemented through one or more processors 1301 or processing means in the second radio base station 13 depicted in FIG. 11, together with computer program code for performing the functions and/or method actions of the embodiments herein. The program code mentioned above may also be provided as a computer program product, for instance in the form of a data carrier carrying computer program code for performing embodiments herein when being loaded into the second radio base station 13. One such carrier may be in the form of a CD ROM disc. It is however feasible with other data carriers such as a memory stick. The computer program code may furthermore be provided as pure program code on a server and downloaded to the second radio base station 13.

The second radio base station 13 comprises a transmitter TX and a receiver RX or a transceiver 1302 for transmitting e.g. BSR configurations to the wireless terminal 10. The transceiver 1302 is further configured to receive a buffer status report when being triggered at the wireless terminal 10. The transceiver 1302 may further be configured to receive an uplink data transmission multiplexed according to: a static configuration defining how to multiplex MAC SDUs, from one or different logical channels onto transport blocks to be delivered to a physical layer on transport channels of a given radio base station out of the at least two radio base stations; and/or a second configuration where if there is data available for multiple logical channels with equal priority towards one radio base station out of the at least two radio base stations, then data of a logical channel for which the BSR is configured towards a radio base station providing a grant, is prioritized.

The second first radio base station 12 further comprises a memory 1303. The memory may be used to store BSR configuration, uplink data transmission configurations, buffer status, thresholds, application to perform the methods herein etc.

Figure 12:
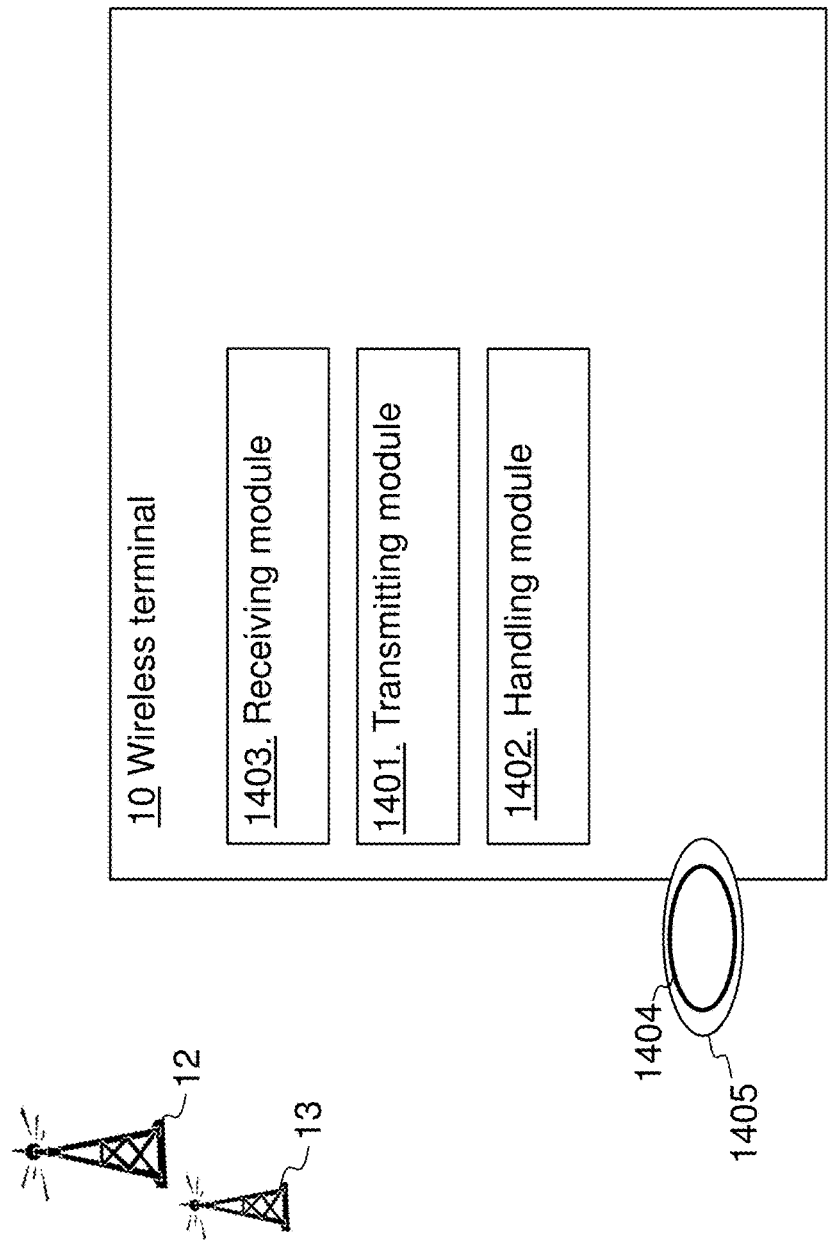
FIG. 12 is a block diagram depicting a wireless terminal according to embodiments herein.

FIG. 12 is a block diagram depicting the wireless terminal 10 for managing or handling UL data transmissions in the radio communications network 1 according to embodiments herein. The wireless terminal 10 is configured for dual connectivity wherein the wireless terminal is served by the first radio base station 12 and the second radio base station 13 in the radio communications network 1.

The wireless terminal 10 may comprise a transmitting module 1401. The wireless terminal 10 and/or the transmitting module 1401 may be configured to transmit a BSR to the first and/or second radio base station when a trigger is being fulfilled as configured at the wireless terminal 10.

The wireless terminal 10 may comprise a handling module 1402. The wireless terminal 10 and/or the handling module 1402 may be configured to handle multiplexing of an uplink data transmission towards the first and second radio base stations according to a static configuration defining how to multiplex MAC SDUs from one or different logical channels onto transport blocks to be delivered to a physical layer on transport channels of a given radio base station out of the first radio base station and the second radio base station; and/or according to a second configuration where if there is data available for multiple logical channels with equal priority towards one of the radio base stations, then data of a logical channel for which the buffer status report is configured towards a radio base station providing a grant, is prioritized. The static configuration may define that UL data transmissions are always sent towards a same radio base station as the buffer status report is transmitted to. Furthermore, the static configuration defines a multiplexing of MAC SDUs to the physical layer grants, by the wireless terminal 10, that follows a fixed RRC configuration used for buffer status report reporting. The second configuration may apply strict prioritization where always data of the logical channel for which buffer status report is configured, is prioritized e.g. when there is data available for multiple bearers with equal priority. The second configuration may apply prioritization until a number of bytes corresponding to the transmitted buffer status report towards the radio base station providing the grant, is reached.

The wireless terminal 10 may further comprise a receiving module 1403. The wireless terminal 10 and/or the receiving module 1403 may be configured to receive a grant, which grant is provided from at least one of the radio base stations out of the first radio base station and the second radio base station. The wireless terminal 10 and/or the receiving module 1403 may be configured to receive a configuration from at least one of the radio base stations defining the static configuration and/or the second configuration.

The methods according to the embodiments described herein for the wireless terminal 10 are respectively implemented by means of a computer program 1404 or computer program product, comprising instructions, i.e., software code portions, which, when executed on at least one processor, cause the at least one processor to carry out the actions described herein, as performed by the wireless terminal 10. The computer program 1404 may be stored on a computer-readable storage medium 1405. The computer-readable storage medium 1405, having stored thereon the computer program 1404, may comprise the instructions which, when executed on at least one processor, cause the at least one processor to carry out the actions described herein, as performed by the wireless terminal 10. In some embodiments, the computer-readable storage medium may be a non-transitory computer-readable storage medium.

Figure 13:
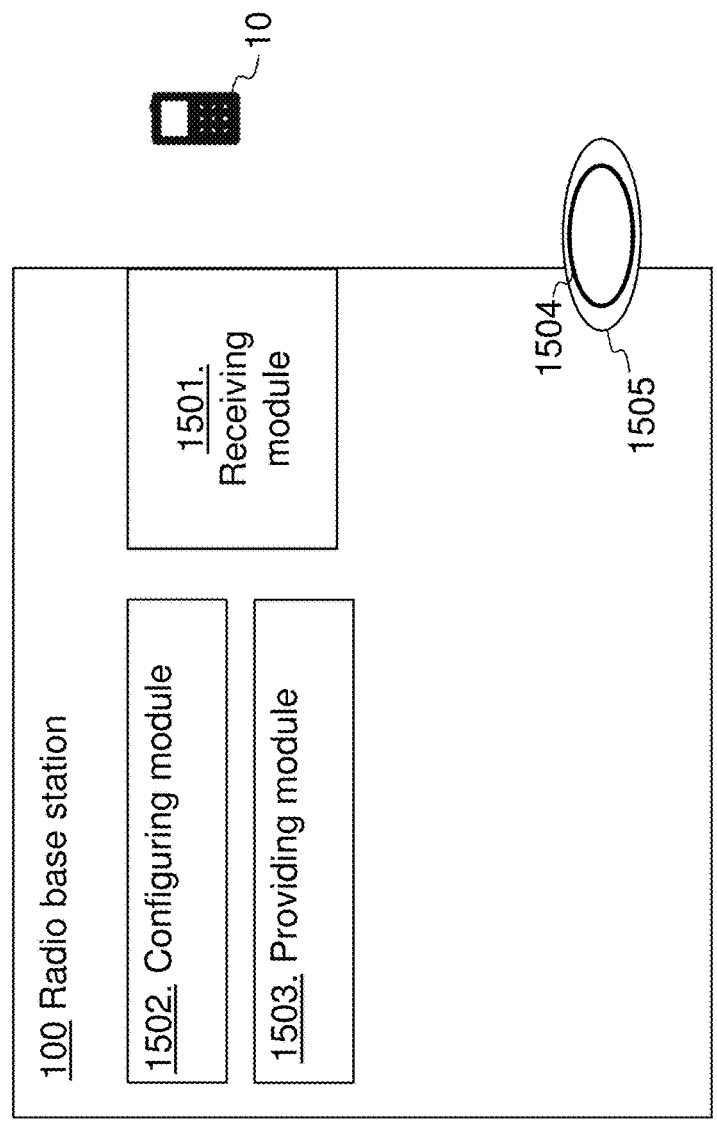
FIG. 13 is a block diagram depicting a radio base station according to embodiments herein.

FIG. 13 is a block diagram depicting a radio base station 100, e.g. the first radio base station 12 or the second radio base station 13, for handling UL data transmissions from the wireless terminal 10 in the radio communications network 1 according to embodiments herein. The radio base station 100 is one radio base station configured, out of at least two radio base stations, to serve the wireless terminal 10 thereby providing dual connectivity to the wireless terminal 10 in the radio communications network 1.

The radio base station 100 may comprise a receiving module 1501. The radio base station 100 and/or the receiving module 1501 may be configured to receive a BSR from the wireless terminal 10 indicating that a trigger is fulfilled for reporting the BSR. The radio base station 100 and/or the receiving module 1501 may further be configured to receive an uplink data transmission multiplexed according to: a static configuration defining how to multiplex MAC SDUs from one or different logical channels onto transport blocks to be delivered to a physical layer on transport channels of a given radio base station out of the at least two radio base stations; and/or a second configuration where if there is data available for multiple logical channels with equal priority towards one radio base station out of the at least two radio base stations, then data of a logical channel for which the BSR is configured towards a radio base station providing a grant, is prioritized.

The radio base station 100 may comprise a configuring module 1502. The radio base station 100 and/or the configuring module 1502 may be configured to configure the wireless terminal 10 for performing reporting of the BSR to the radio base station 100 and/or another radio base station out of the at least two radio base stations, when a trigger is being fulfilled. The radio base station 100 and/or the configuring module 1502 may further be configured to configure the wireless terminal 10 for handling multiplexing of the uplink data transmission according to the static configuration and/or the second configuration.

The radio base station 100 may comprise a providing module 1503. The radio base station 100 and/or the providing module 1503 may be configured to provide the wireless terminal 10 with a grant.

The methods according to the embodiments described herein for the radio base station 100 are respectively implemented by means of a computer program 1504 or computer program product, comprising instructions, i.e., software code portions, which, when executed on at least one processor, cause the at least one processor to carry out the actions described herein, as performed by the radio base station 100. The computer program 1504 may be stored on a computer-readable storage medium 1505. The computer-readable storage medium 1505, having stored thereon the computer program 1504, may comprise the instructions which, when executed on at least one processor, cause the at least one processor to carry out the actions described herein, as performed by the radio base station 100. In some embodiments, the computer-readable storage medium may be a non-transitory computer-readable storage medium.

As will be readily understood by those familiar with communications design, that functions from other modules may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless terminal or network node, for example.

Alternatively, several of the functional elements of the processing means discussed may be provided through the use of dedicated hardware, while others are provided with hardware for executing software, in association with the appropriate software or firmware. Thus, the term "processor" as used herein does not exclusively refer to hardware capable of executing software and may implicitly include, without limitation, digital signal processor (DSP) hardware, read-only memory (ROM) for storing software, random-access memory for storing software and/or program or application data, and non-volatile memory. Other hardware, conventional and/or custom, may also be included. Designers of communications receivers will appreciate the cost, performance, and maintenance trade-offs inherent in these design choices.

Embodiments herein shows a method performed by a wireless terminal for managing or handling data transmissions in a radio communications network. The wireless terminal is served by a first radio base station and a second radio base station providing dual connectivity to the wireless terminal in the radio communications network. The wireless terminal may transmit a buffer status report to the first and/or second radio base station when a trigger is being fulfilled. Further embodiments relate to a method in a first radio base station. The first radio base station is comprised in a radio communications network. The radio communications network comprises a second radio base station. The first and second radio base station provides dual connectivity to the wireless terminal in the radio communications network. Thus, the first radio base station and the second radio base station have bearers established to the wireless terminal for carrying data traffic to the user equipment, or the first and second radio base station serve the wireless terminal. The first radio base station receives a buffer status report from the wireless terminal. The first radio base station then coordinate with the second radio base station before scheduling data to the wireless terminal. Otherwise there is a risk that wireless terminal is scheduled over multiple cells and resources are wasted.

A wireless terminal and a radio base station are also provided herein.

Modifications and other embodiments of the disclosed embodiments will come to mind to one skilled in the art having the benefit of the teachings presented in the foregoing descriptions and the associated drawings. Therefore, it is to be understood that the embodiment(s) is/are not to be limited to the specific embodiments disclosed and that modifications and other embodiments are intended to be included within the scope of this disclosure. Although specific terms may be employed herein, they are used in a generic and descriptive sense only and not for purposes of limitation.

The invention claimed is:

1. A method performed in a wireless terminal for managing or handling uplink (UL) data transmissions in a radio communications network, wherein the wireless terminal is served by a first radio base station and a second radio base station providing dual connectivity to the wireless terminal in the radio communications network, the method comprising:

transmitting a buffer status report (BSR) to the first radio base station or second radio base station, or both, in response to a trigger being fulfilled as configured at the wireless terminal; and handling multiplexing of an uplink data transmission towards the first and second radio base stations according to a configuration where if there is data available for multiple logical channels with equal priority towards one of the radio base stations, then data of a logical channel for which the buffer status report is configured towards a radio base station providing a grant is prioritized.

2. The method of claim 1, wherein the configuration applies strict prioritization where data of the logical channel for which the buffer status report is configured is always prioritized.

3. The method of claim 1, wherein the configuration applies prioritization until a number of bytes corresponding to the transmitted buffer status report towards the radio base station providing the grant is reached.

4. The method of claim 1, further comprising receiving a grant, which grant is provided from at least one of the radio base stations out of the first radio base station and the second radio base station.

5. The method of claim 1, further comprising receiving a configuration from at least one of the radio base stations defining the configuration.

6. A method performed in a radio base station for handling uplink (UL) data transmissions from a wireless terminal in a radio communications network, wherein the radio base station is one radio base station out of at least two radio base stations serving the wireless terminal providing dual connectivity to the wireless terminal in the radio communications network, the method comprising:

receiving a buffer status report (BSR) from the wireless terminal indicating that a trigger is fulfilled for reporting the BSR; and receiving an uplink data transmission multiplexed according to a configuration where if there is data available for multiple logical channels with equal priority towards one radio base station out of the at least two radio base stations, then data of a logical channel for which the BSR is configured towards a radio base station providing a grant is prioritized.

7. The method of claim 6, further comprising configuring the wireless terminal for performing reporting of the BSR to the radio base station and/or another radio base station out of the at least two radio base stations, when a trigger is being fulfilled.

8. The method of claim 6, further comprising configuring the wireless terminal for handling multiplexing of the uplink data transmission according to the configuration.

9. The method of claim 6, further comprising providing the wireless terminal with a grant.

10. A wireless terminal for managing or handling uplink (UL) data transmissions in a radio communications network, wherein the wireless terminal is configured for dual connectivity wherein the wireless terminal is served by a first radio base station and a second radio base station in the radio communications network, the wireless terminal being configured to:

transmit a buffer status report (BSR) to the first radio base station or the second radio base station, or both, in response to a trigger being fulfilled as configured at the wireless terminal; and handle multiplexing of an uplink data transmission towards the first and second radio base stations according to a configuration where if there is data available for multiple logical channels with equal priority towards one of the radio base stations, then data of a logical channel for which the buffer status report is configured towards a radio base station providing a grant is prioritized.

11. The wireless terminal of claim 10, wherein the configuration applies strict prioritization where data of the logical channel for which the buffer status report is configured is always prioritized.

12. The wireless terminal of claim 10, wherein the configuration applies prioritization until a number of bytes corresponding to the transmitted buffer status report towards the radio base station providing the grant is reached.

13. The wireless terminal of claim 10, being configured to receive a grant, which grant is provided from at least one of the radio base stations out of the first radio base station and the second radio base station.

14. The wireless terminal of claim 10, being configured to receive a configuration from at least one of the radio base stations defining the configuration.

15. A radio base station for handling uplink (UL) data transmissions from a wireless terminal in a radio communications network, wherein the radio base station is one radio base station configured, out of at least two radio base stations, to serve the wireless terminal, thereby providing dual connectivity to the wireless terminal in the radio communications network, the radio base station being configured to receive a buffer status report (BSR) from the wireless terminal indicating that a trigger is fulfilled for reporting the BSR; and receive an uplink data transmission multiplexed according to a configuration where if there is data available for multiple logical channels with equal priority towards one radio base station out of the at least two radio base stations, then data of a logical channel for which the BSR is configured towards a radio base station providing a grant is prioritized.

16. A radio base station according to claim 15, further being configured to configure the wireless terminal for performing reporting of the BSR to the radio base station and/or another radio base station out of the at least two radio base stations, when a trigger is being fulfilled.

17. A radio base station according to claim 15, further being configured to configure the wireless terminal for handling multiplexing of the uplink data transmission according to the configuration.

18. A radio base station according to claim 15, further being configured to provide the wireless terminal with a grant.

19. A non-transitory computer-readable storage medium, having stored thereon a computer program comprising instructions that, when executed on at least one processor of a wireless terminal, cause the at least one processor to carry out the method according to claim 1.

* * * * *